United States Patent
Dama et al.

(10) Patent No.: US 12,062,106 B1
(45) Date of Patent: Aug. 13, 2024

(54) DETECTING AND ADDRESSING MICRO-HAZARDS

(71) Applicant: UIPCO, LLC, San Antonio, TX (US)

(72) Inventors: Nikhil Dama, Apex, NC (US); Laura Frisbie Evans, Roswell, GA (US); Christopher Ryan Haberland, Seattle, WA (US); Ting Lu, San Antonio, TX (US); Simon Phillip Stolarczyk, San Antonio, TX (US); Kristopher Thomas Williams, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 141 days.

(21) Appl. No.: 17/702,071

(22) Filed: Mar. 23, 2022

(51) Int. Cl.
*G06Q 50/26* (2024.01)
*G01C 21/34* (2006.01)
(Continued)

(52) U.S. Cl.
CPC ....... *G06Q 50/265* (2013.01); *G01C 21/3461* (2013.01); *G01C 21/3602* (2013.01);
(Continued)

(58) Field of Classification Search
CPC .. G06Q 50/265; G06Q 40/08; G01C 21/3461; G01C 21/3602; G01C 21/3647; G01C 21/365; G01C 21/3694
(Continued)

(56) References Cited

U.S. PATENT DOCUMENTS 10,387,961 B1    8/2019  Burgess et al.
10,699,346 B1 *  6/2020  Corder .................. G06Q 40/08
(Continued)

FOREIGN PATENT DOCUMENTS

EP      4033426 A1 *  7/2022  .......... G06F 18/214
TW   201638894 A  * 11/2016  ............. G05B 15/02
(Continued)

OTHER PUBLICATIONS

"Challenges of analyzing multi-hazard risk: a review," by Melanie S. Kappes; Margreth Keiler; Kirsten von Elverfeldt; and Thomas Glade. Nat. Hazards (2012) 64: pp. 1925-1958. (Year: 2012).*
(Continued)

*Primary Examiner* — Sara C Hamilton
(74) *Attorney, Agent, or Firm* — Potomac Law Group PLLC; Dannon G. Allbee (57) ABSTRACT

A micro-hazard monitoring system detects and addresses micro-hazards in a user's environment. The system directs the user to traverse the environment, gathering mapping data for the space and objects found there. The system maps the user's environment, noting the locations and types of objects. Movement and wear simulations are performed on the mapped space advancing time to estimate the likelihood of damaging user/object interactions and the extents of any resulting damage, based on information in that map, the system notes potential problems and computes one or more micro-hazard scores reflecting the nature and severity of the potential problems. If a score so warrants, the system takes remedial action to address the micro-hazard, such as warning the user about the existence of the micro-hazard and potentially what to do about it and/or taking a direct action such as shutting off an electronic device.

19 Claims, 8 Drawing Sheets

(51) Int. Cl.
*G01C 21/36* (2006.01)
*G06Q 40/08* (2012.01)

(52) U.S. Cl.
CPC ....... *G01C 21/3647* (2013.01); *G01C 21/365* (2013.01); *G01C 21/3694* (2013.01); *G06Q 40/08* (2013.01)

(58) Field of Classification Search
USPC .......................................................... 705/4
See application file for complete search history.

(56) References Cited

U.S. PATENT DOCUMENTS

| | | | | |
|---|---|---|---|---|
| 11,003,334 | B1* | 5/2021 | Conway | G06Q 40/08 |
| 11,017,487 | B1* | 5/2021 | Campbell | G06Q 50/16 |
| 11,556,995 | B1* | 1/2023 | Little | G06Q 40/08 |
| 11,556,997 | B1* | 1/2023 | Corder | G06Q 40/08 |
| 11,810,202 | B1* | 11/2023 | Little | G06F 16/29 |
| 2006/0253307 | A1 | 11/2006 | Warren et al. | |
| 2012/0115453 | A1 | 5/2012 | Zheng | |
| 2015/0170287 | A1 | 6/2015 | Tirone et al. | |
| 2016/0379326 | A1* | 12/2016 | Chan-Gove | H04L 63/107 705/325 |
| 2017/0140631 | A1* | 5/2017 | Pietrocola | G01J 1/4204 |
| 2019/0102840 | A1 | 4/2019 | Perl et al. | |
| 2019/0378216 | A1* | 12/2019 | Fiete | G06Q 10/067 |
| 2020/0007540 | A1 | 1/2020 | Kawaguchi et al. | |
| 2020/0134733 | A1* | 4/2020 | Maddox | G06Q 40/08 |
| 2020/0175786 | A1 | 6/2020 | Bongers et al. | |
| 2021/0049526 | A1* | 2/2021 | Roman | G06Q 10/0635 |
| 2021/0258756 | A1* | 8/2021 | Mcdougall | G06Q 10/0635 |
| 2021/0358051 | A1* | 11/2021 | Nussbaum | G06F 30/20 |
| 2022/0004684 | A1* | 1/2022 | Davis | G06T 19/006 |
| 2023/0113078 | A1* | 4/2023 | Patt | H04L 51/02 705/4 |
| 2023/0113765 | A1* | 4/2023 | Patt | G06Q 40/08 705/4 |
| 2023/0116513 | A1* | 4/2023 | Patt | H04L 51/046 705/4 |
| 2023/0116902 | A1* | 4/2023 | Patt | G06Q 40/08 705/4 |

FOREIGN PATENT DOCUMENTS

| | | | | |
|---|---|---|---|---|
| WO | WO-2021176421 | A1 * | 9/2021 | G06F 16/29 |
| WO | WO-2023051904 | A1 * | 4/2023 | |

OTHER PUBLICATIONS

Frees, Edward W., Glenn Meyers, and A. David Cummings. "Predictive modeling of multi-peril homeowners insurance." Variance 6.1 (2012): 11-31. (Year: 2012).*

Zuccaro, Giulio, Daniela De Gregorio, and Mattia F. Leone. "Theoretical model for cascading effects analyses." International journal of disaster risk reduction 30 (2018): 199-215. (Year: 2018).*

* cited by examiner

DETECTING AND ADDRESSING MICRO-HAZARDS

TECHNICAL FIELD

The present disclosure is directed to detecting and addressing micro-hazards in a home, workplace, or other environment.

BACKGROUND

People are used to preparing against large-scale hazards in their environments. They may, for example, follow strict codes when building in known earthquake zones. However, an environment may also have a set of smaller "micro-hazards." In a home, for example, a lamp set too close to an edge of a table may fall over and break, or steam from a shower may damage a nearby electronic device. People often overlook micro-hazards in their environment because they may be too common to rise to notice or because their potential for harm often seems to be quite small. While it is true that many of these micro-hazards will not cause the kind of destruction associated with an earthquake or flood, in some situations one micro-hazard may trigger another micro-hazard in a cascade that eventually causes serious damage.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to a micro-hazard monitoring system that detects and addresses micro-hazards in a user's environment. The system directs the user to traverse the environment and take pictures of objects found there. The system maps the user's environment, noting the locations and types of objects. Based on information in that map, the system notes potential problems and computes one or more micro-hazard scores reflecting the nature and severity of the potential problems. If a score so warrants, the system takes remedial action to address the micro-hazard.

The route that the micro-hazard monitoring system directs the user to take through the environment may be based on maps that can be predefined or generated by the system as the user moves about the environment. Areas of inadequate knowledge, such as doors that may lead to areas not yet mapped, are found, and the user is directed to traverse those areas so that they can be mapped. If there is no existing map, then the system can map a current room with SLAM technologies (e.g., applying computer vision technologies to determine the room's layout) and can direct the user to move into unmapped spaces, e.g., through portals such as doors, stairs, etc.

As the user follows the directed route, the system can take pictures (e.g., automatically or by instructing the user to take pictures a particular locations) and/or use other depth mapping technologies (e.g., LIDAR, infrared mapping, sonar, etc.) to determine the space dimensions and the identity and placement of objects in the space. The pictures or other mapping data are scanned by an artificial intelligence that determines the type of each object. Alternatively or in combination, the micro-hazard monitoring system can ask the user to identify the types of objects shown in the pictures.

The micro-hazard monitoring system maps a location of an object in the space using the pictures and/or other mapping data, e.g., by determining the object's location in relation to other objects whose locations are already known. Locations of objects may be continually updated in the map as the system gathers additional data or receives data from item-trackers (e.g., RFID tags) attached to items. The user may also wear a location-tracking device when traversing the space, and information from that tracking device informs the system of the location and orientation of each picture or other mapping data.

In some implementations, aspects of the micro-hazard monitoring system are integrated into an artificial-reality ("XR") system (of all sorts including enhanced reality: see below). As the user follows the route directions, an XR system can note his location and direct an HMD (using a mounted camera) to take the requested photographs and/or gather other mapping data.

The micro-hazard monitoring system uses the received information to make a map of the user's space. When it has at least a rough map, the system considers the relative locations and types of objects in the map, looking for potential problems. For example, the system might note a lamp placed near the edge of a table. The system may see the close proximity of the lamp and table edge as an indication of a "breakage due to fall" micro-hazard. In some cases one identified micro-hazard may potentially trigger another causing a cascade of micro-hazards. For example, in a first micro-hazard, a heating, ventilation, and air-conditioning ("HVAC") unit in an attic over a garage may leak causing water damage to the attic floor and garage ceiling. That first micro-hazard might trigger a second: the garage ceiling may collapse because of the water damage and fall onto a car parked underneath. In various implementations, the system can identify micro-hazards by performing movement and wear simulations in the mapped space. For example, the system can determine likely user pathways through the space, how objects with defined types are expected to move given their properties and the physics laws (e.g., as defined in a knowledge base), how objects are expected to experience wear over time, likely results of environment and weather factors (e.g., water seepage, tree limbs falling, wind forces, hail damage), etc. From these movement and wear determinations, the system can perform various simulations, advancing time to determine when objects are likely to experience forces that, given their current wear, are likely to cause breakages. The simulations can then further advance time to determine how the projected breakages may further affect other objects. Thus, the system can identify these individual and cascading breakages as micro-hazards.

The identified micro-hazards are assigned one or more scores. These scores can depend upon the likelihood of the hazard actually occurring, the extent of damage it might cause, the potential of cascading micro-hazards, and the like. These values can all be determined by the simulations, which can include aspects such as likelihood of a movement occurring and extent of resulting damage.

When an assigned score is such that a remediation action is called for (e.g., it is above a threshold), the micro-hazard monitoring system may choose one or more actions, depending upon the score, the type of micro-hazard, and the resources at the system's disposal. Exemplary actions include warning the user about the existence of the micro-hazard and potentially what to do about it, taking a direct action such as shutting off an electronic device or utility associated with the micro-hazard, and sending underwriting or claim-validation information to an insurer. The last may be useful in reconciling an insurance claim if the user is informed of a micro-hazard but does nothing to remediate it. The knowledge that micro-hazard information can be sent to his insurer incents the user to secure his environment from micro-hazards which may in turn reduce his insurance premiums.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Previous systems do not address micro-hazards. They neither detect the presence of micro-hazards nor provide remediation actions to combat them. For example, property owners are on their own to find micro-hazards in their environments and to know how to lessen their potential impact. They may easily miss some micro-hazards. Building inspectors do not look for object placement and cascading micro-hazards. Underwriting inspections focus on large-scale hazards such as earthquakes and fire, but not on micro-hazards. The micro-hazard monitoring system and methods disclosed herein are expected to overcome these deficiencies in existing systems. The system addresses multiple types of micro-hazards, including breakage due to fall, leakage of water, heat, steam, etc., electrical interaction, fire damage, poisoning, or any combination thereof. The system is integrated with XR technology for mapping the space and applies artificial intelligence to identify objects. The system further computes simulations on the space to identify the likelihood of user/object interactions. The system's technological underpinnings make it more comprehensive than any previous system, whether automated or fully human controlled, in considering interactions among objects in the user's space and in potential movement patterns. Its remediation actions are therefore also more comprehensive than those produced by previous systems. By finding and addressing micro-hazards, the micro-hazard monitoring system increases the utility of the systems on which it runs and reduces the user's exposure to risk.

Figure 1:
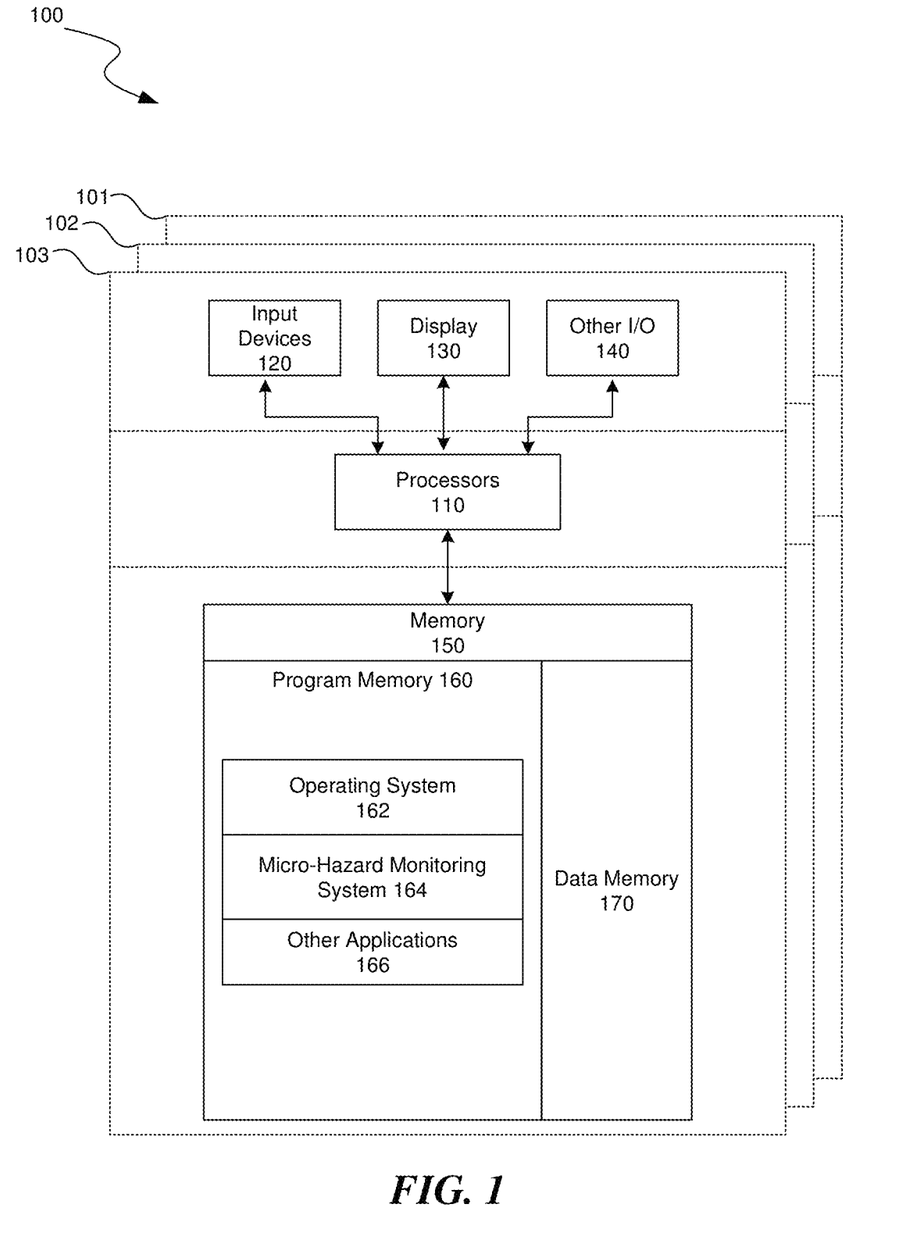
FIG. 1 is a block diagram illustrating an overview of devices on which some implementations of the present technology can operate.

Several implementations are discussed below in more detail in reference to the figures. FIG. 1 is a block diagram illustrating an overview of devices on which some implementations of the disclosed technology can operate. The devices can comprise hardware components of a computing system 100 that monitors micro-hazards. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, a micro-hazard monitoring system 164, and other application programs 166. Memory 150 can also include data memory 170 that can include, e.g., virtual models mapping real and virtual locations of object and users, environmental data, configuration data, settings, user options or preferences, a micro-hazard scoring knowledge base, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
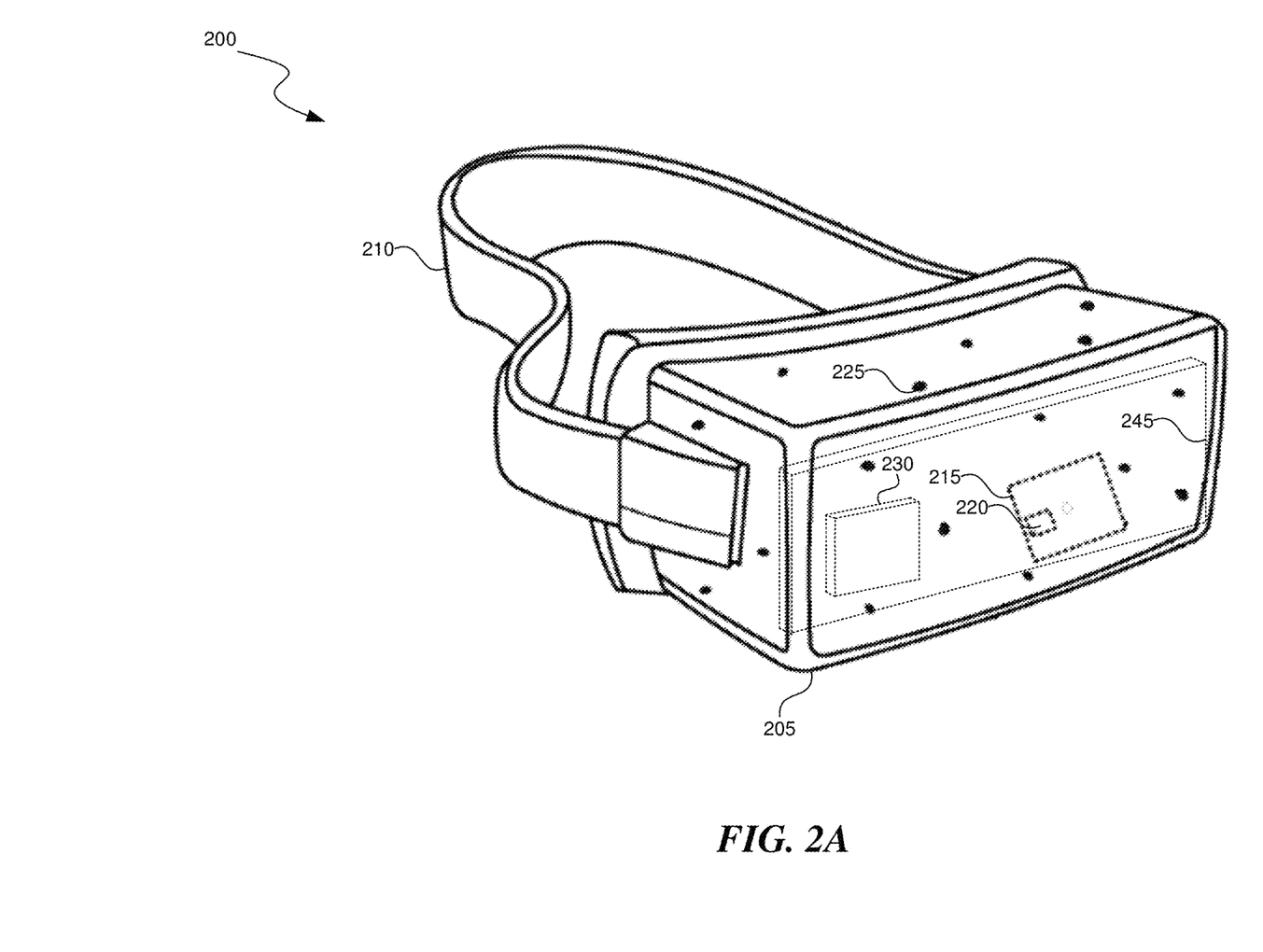
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
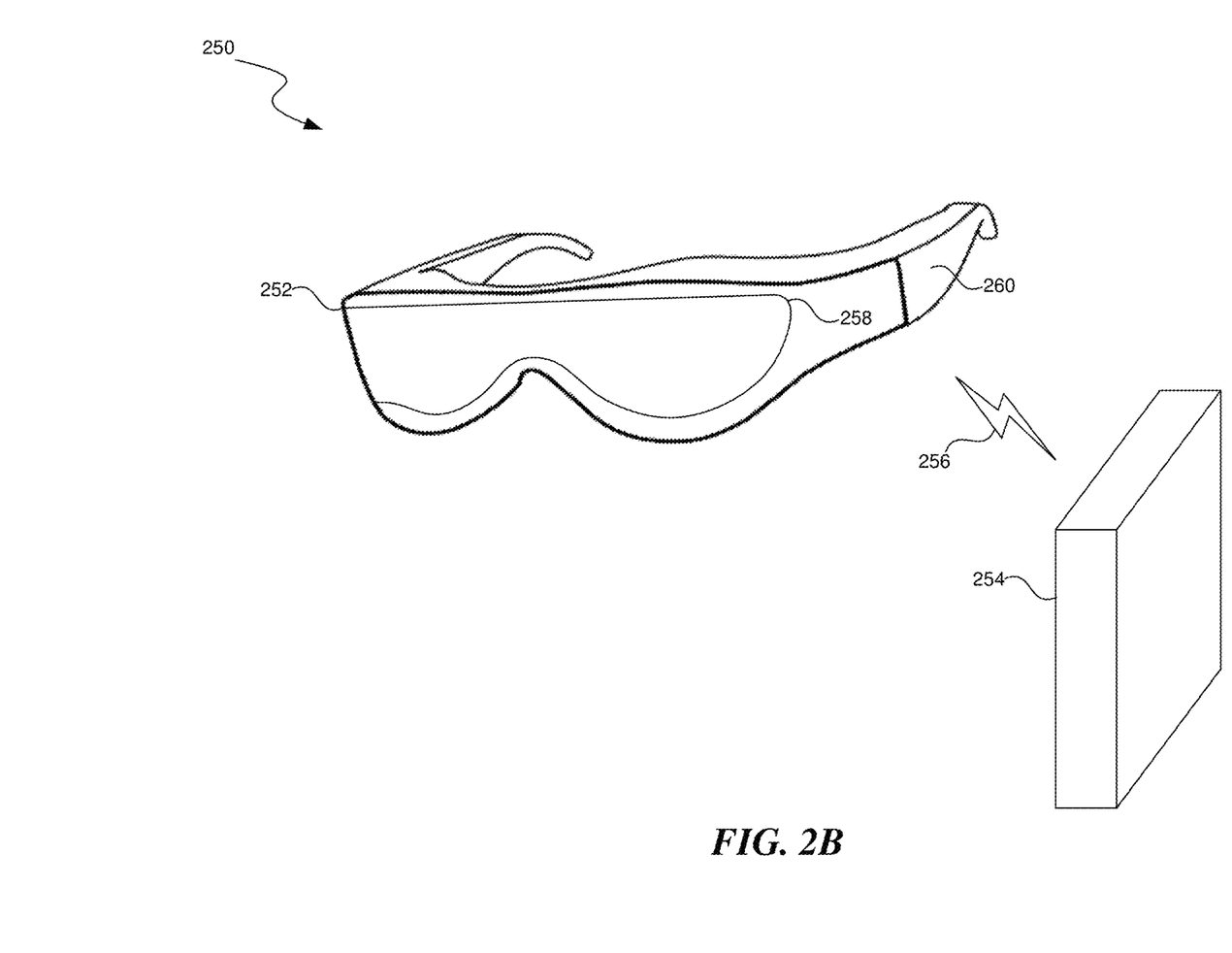
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
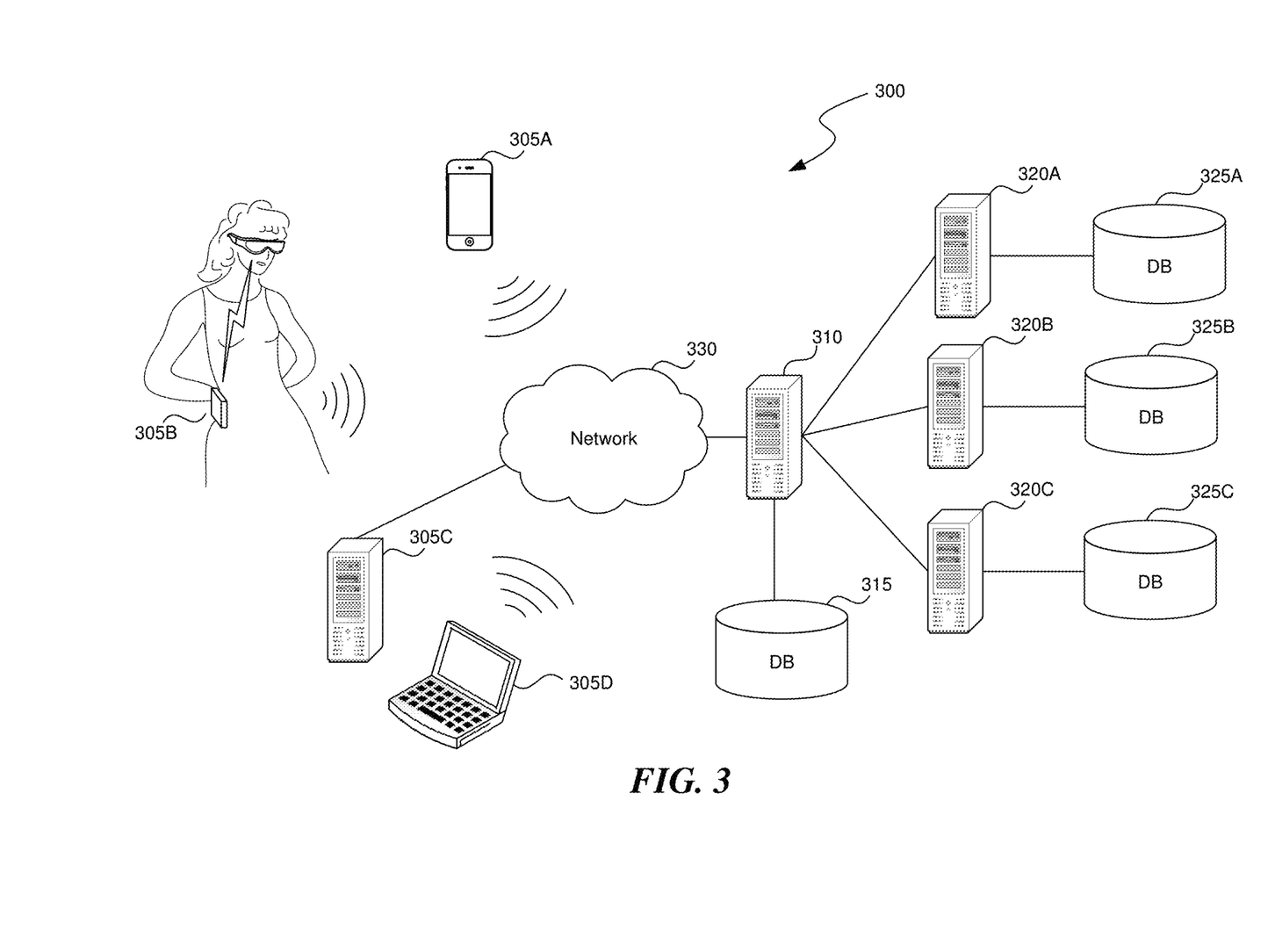
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have its own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
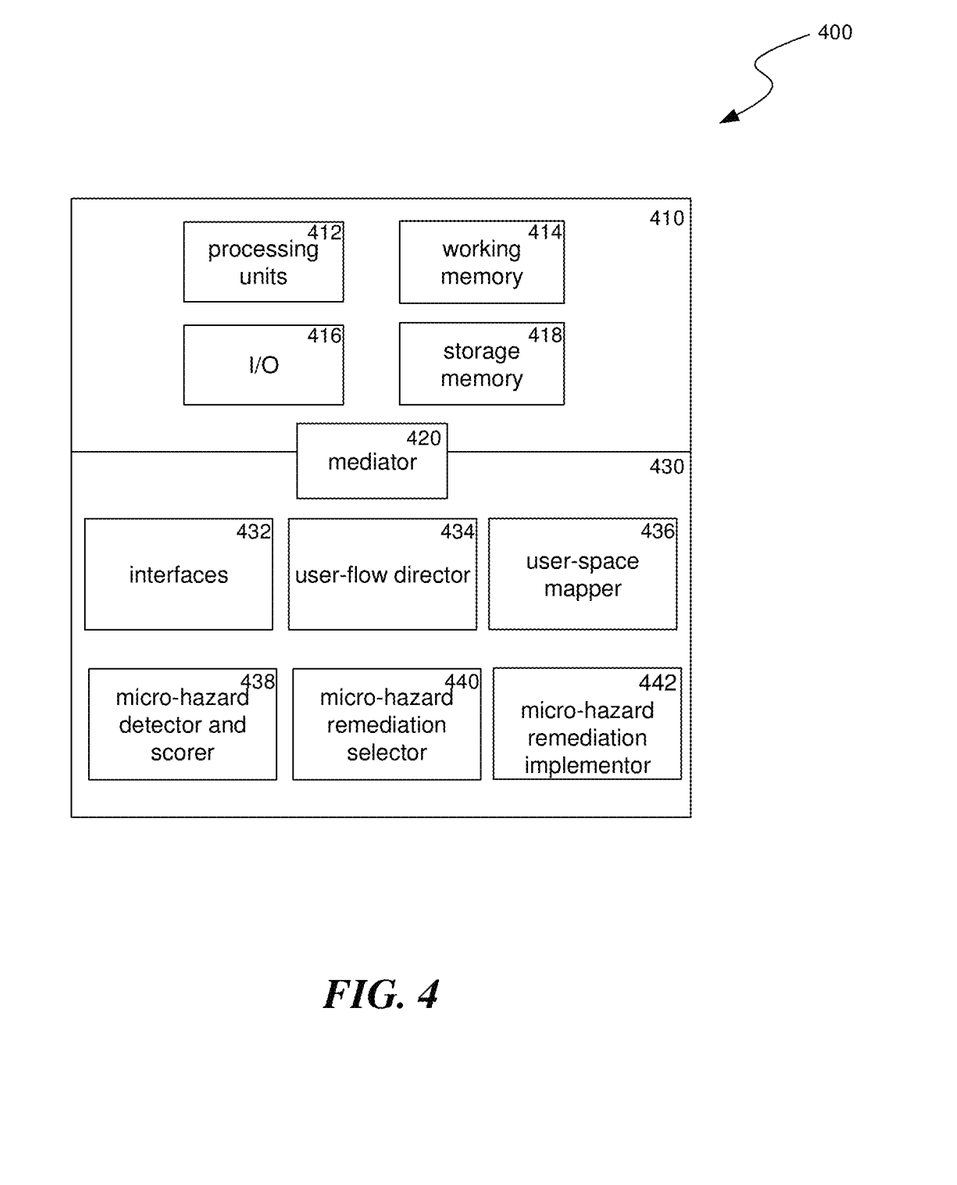
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for detecting and addressing micro-hazards. Specialized components 430 can include a user-flow director 434, a user-space mapper 436, a micro-hazard detector and scorer 438, a micro-hazard remediation selector 440, a micro-hazard remediation implementor 442, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

In various implementations, the user-flow director 434 creates directions for the user to take while traversing the environment. These directions may be based on existing maps, such as those provided by SLAM, described above in relation to FIG. 1. If there are areas in the existing maps of inadequate knowledge, such as doors that may lead to areas not yet mapped, then the user may be directed to traverse those areas so that they can be mapped. If there is no existing map, then the system may map a current space and direct the user to progress through portals (e.g., doors, stairs, etc.) to map additional portions of the space. The directions also include positions where the user-flow director 434 will obtain mapping readings (e.g., pictures, depth scans, etc.) This may be done manually (through requesting that the user take pictures), or the pictures or other mapping data may be taken automatically, e.g., by a camera or other sensor on the user's HMD 200, 250 when the user reaches specified 6DoF positions (see the description of FIG. 2A above) within the space as determined by SLAM or by another location-tracking device. Additional details on the workings of the user-flow director 434 are provided below in relation to block 502 of FIG. 5.

The information gathered by the user during the route traversal is received by the user-space mapper 436 through the interfaces 432. The user-space mapper 436 creates a map (possibly SLAM-based) that includes types and locations of objects in the space. If the user-space mapper 436 receives a picture of an object without also receiving useful location information, the user-space mapper 436 may determine the object's location by viewing pictures showing the object in relation to other objects whose locations are already known. To determine the type of objects, an artificial intelligence scans the photographs. Alternatively or in combination, the micro-hazard monitoring system can ask the user to identify the types of objects shown in the pictures. Additional details of the user-space mapper 436 are provided below in relation to block 504 of FIG. 5.

The micro-hazard detector and scorer 438 reviews the map for the types and relative locations of sets of objects in the map, looking for potential problems (i.e., micro-hazards). In various implementations, the micro-hazard detector and scorer 438 identifies micro-hazards by performing movement and wear simulations in the mapped space. For example, the micro-hazard detector and scorer 438 can determine likely user pathways through the space, how objects with defined types are expected to move given their properties and the physics laws, how objects are expected to experience wear over time, likely results of environment and weather factors (e.g., water seepage, tree limbs falling, wind forces, hail damage), etc. In some cases, the object properties and wear patterns can be defined in a knowledge base. For example, when the user-space mapper 436 identifies and object, it can find the closest matching object in the knowledge base (e.g., by matching object types). That defined object can specify likely movement amounts and patterns for the object (e.g., a typical range of movement for the object in a given time amount and/or how the object reacts to forces—such as does it roll, slide, its mass, etc.), forces required to case damage to the object, reactions of the object to other forces and substances (e.g., water reactive, damaged by smoke, etc.), value of the object, etc. From these movement and wear determinations, the micro-hazard detector and scorer 438 can perform various simulations, advancing time to determine when objects are likely to experience forces that, given their current wear, are likely to cause breakages. The simulations can then further advance time to determine how the projected breakages may further affect other objects. Thus, the system can identify these individual and cascading breakages as micro-hazards. In some cases one identified micro-hazard may potentially trigger another causing a cascade of micro-hazards. To every micro-hazard that it identifies, the micro-hazard detector and scorer 438 assigns one or more scores, the scores depending upon the likelihood of the hazard actually occurring, the extent of damage it might cause, the potential of cascading micro-hazards, and the like, as determined in the simulations. A higher score is associated with a higher risk. Additional details of the micro-hazard detector and scorer 438 are provided below in relation to block 506 of FIG. 5. C:

The micro-hazard remediation selector 440 takes the score(s) from the micro-hazard detector and scorer 438 along with information about the types and locations of objects in the set of objects associated with the micro-hazard. If an assigned score is above a threshold, the micro-hazard remediation selector 440 may choose one or more actions, depending upon the score, the type of micro-hazard, and the resources at the system's disposal. A low score may warrant just a warning message, while a high score could warrant more active intervention such as shutting off an electronic device associated with the micro-hazard. Additional details on the workings of the micro-hazard remediation selector 440 are provided below in relation to block 508 of FIG. 5.

The micro-hazard remediation implementor 442 implements the actions selected by the micro-hazard remediation selector 440. Specific implementations depend upon the specifics of the selected remediation and on the resources available. Additional details on the micro-hazard remediation implementor 442 are provided below in relation to block 510 of FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
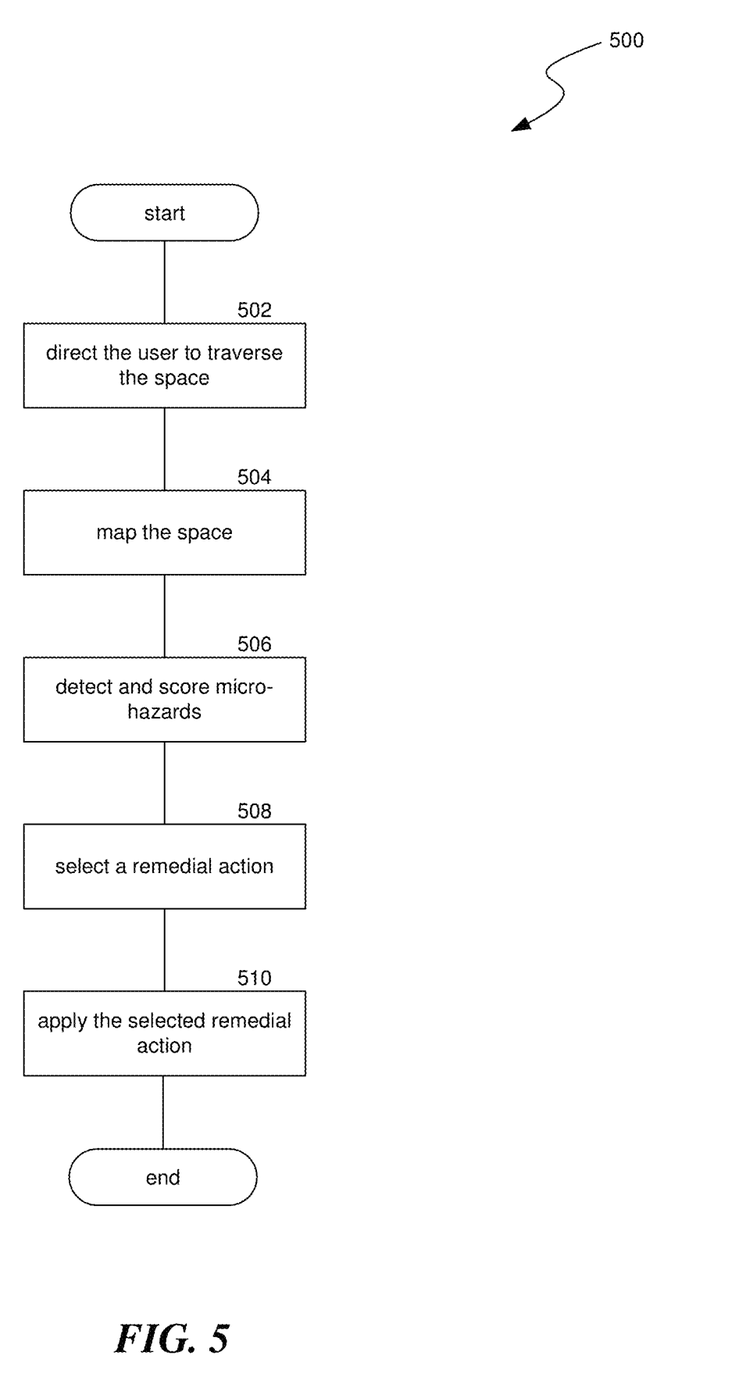
FIG. 5 is a flow diagram illustrating a process used in some implementations of the present technology for detecting and addressing micro-hazards.

FIG. 5 is a flow diagram illustrating a process 500 used in some implementations for detecting and addressing micro-hazards. The process 500 may be invoked in response to a user command, for example when the user places an expensive object in her environment and wants to use the process 500 to provide some security. If the object is separately insured, then the insurer may request that the user invoke process 500 to remap the space around the object. In other situations, the process 500 may be periodically invoked to see if anything in the space has changed and whether previously implemented remediation procedures (see the text accompanying block 510) are still in effect.

In some implementations, the micro-hazard monitoring process 500 can be performed on a user device (e.g., the user's HMD 200, a mobile phone or tablet, etc.) In other implementations, process 500 can be performed on a server system, which can, in-turn, receive information from, and provide controls to, such a user device.

Figure 6:
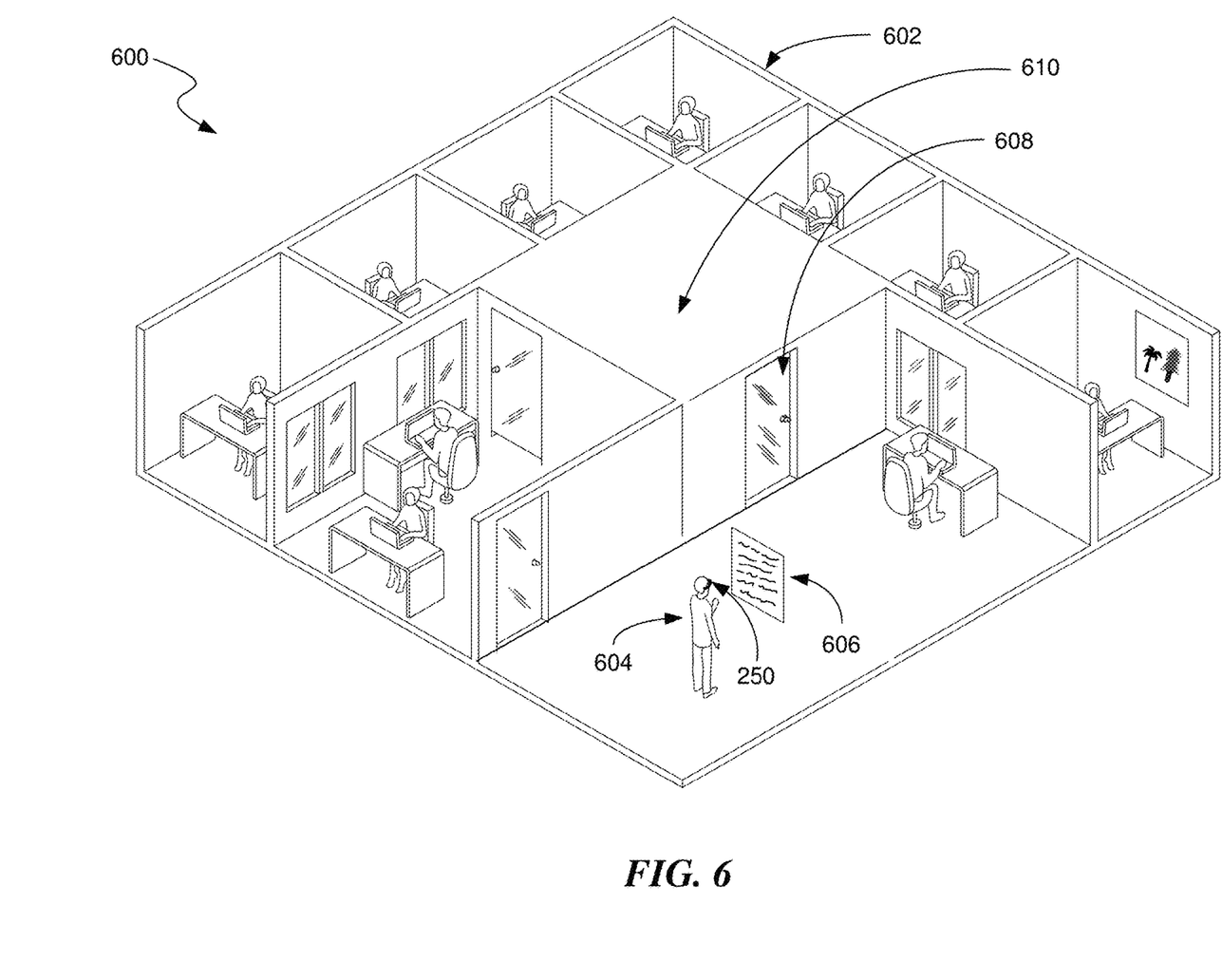
FIG. 6 is a conceptual diagram of a user reviewing route instructions before traversing a space.

The micro-hazard monitoring process 500 begins with block 502 where route directions for a traversal of the space are created and presented to the user. If at least a portion of the space has already been mapped (e.g., by SLAM), then the process 500 may choose to concentrate the user's traversal on areas of inadequate knowledge, such as previously mapped doors that may lead to areas not yet mapped. The process 500 may also use input directly from the user about where an existing map should be updated, for example if the living room contains a newly purchased vase. FIG. 6 presents a scenario where the user is directed to fill in voids in an existing map.

If there is no existing map, then the micro-hazard monitoring process 500 can generate a map of a current space and can direct the user to progress through identified portals (e.g., doors, stairs, etc.) to map additional portions of the space.

The route instructions include positions where process 500 captures mapping data. This can include requesting that the user take pictures and/or automatically capturing images or other mapping data with a user device. The micro-hazard monitoring system 500 may decide on these locations by itself based on its knowledge of existing maps. It may also receive input from the user as to where photographs should be taken, for example, in the living room with the new vase.

The pictures may be taken manually by the user responding to the directions. If the micro-hazard monitoring process 500 is part of an integrated XR system, then the pictures or other mapping data may be taken automatically by a camera or other sensors in the user's HMD 200 when the user reaches the 6DoF positions (see the description of FIG. 2A above) within the space specified in the directions. The user's 6DoF position may be determined by SLAM or by another location-tracking system. In this scenario, the route map may be presented to the user move-by-move either visually in her HMD's view screen or as audio instructions played through the HMD's speakers.

In block 504, the micro-hazard monitoring process 500 receives the information generated by the user's traversal of the space. This information may include the photographs taken and the 6DOF positions of the camera when it took them, depth data, GPS coordinates, pre-existing maps or room scans, etc. The process 500 uses this information to create a map or to update an existing map. The possibly SLAM-based map includes the types and locations of objects identified during the traversal. In some situations (e.g., if the user is using neither an XR system nor a location-tracking device), the received information does not include exact object-location information. Here, the process 500 may be able to determine an object's location by viewing pictures (which in some case can include depth data) showing the object in relation to other objects whose locations are already known from previous mappings. Locations of objects may be continually updated in the map as the system gathers additional data or receives data from item-trackers (e.g., RFID tags) attached to items.

To determine the type of objects, an artificial intelligence scans the photographs and assigns them their most likely object type. For example, a machine learning model can be trained to take an image and identify in the image portions that correspond to particular objects, with labels for those objects such as wall, table, floor, vase, television, art, water heater, electrical outlet, electronic equipment, vehicle, couch, chair, bed, etc. Alternatively or in combination, the process 500 can ask the user to identify the types of objects shown in the pictures—e.g., allowing the user to update determinations from the machine learning model or add identifiers for objects the machine learning model was not able to identify. Process 500 can identify structural elements such as walls, floor, ceiling, etc. by identifying flat planes above a certain size that intersect to define rooms. Process 500 can further identify modifiers to these structural elements such as doors, windows, outlets, etc. by identifying specific kinds of shapes on the structural elements. Process 500 can map the room in relation to other rooms e.g., using GPS or other location data for the gathered mapping data. Finally, process 500 can use the machine learning models to get depth data and position data for other objects in the room, filling the room with objects.

As indicated above in relation to block 502, a review of the received information may indicate to the micro-hazard monitoring process 500 the presence of a door about the contents beyond which the process 500 is entirely ignorant. The process 500 can direct the user through the door in a future mapping traversal. The user may follow this direction or may decline it (e.g., if the door leads to an area the user does not want to map, such as when the door leads outside).

In block 506, the micro-hazard monitoring process 500 reviews the updated or newly created map. It considers the types and relative locations of sets of objects in the map, looking for potential problems (i.e., micro-hazards). In various implementations, if a set of objects may indicate a micro-hazard, the process 500 calls upon a micro-hazard scoring knowledge base that knows (i) what types of objects may deleteriously interact with other types of objects, (ii) how near the objects must be for that interaction to be possible, and (iii) what are the expected consequences of the deleterious interaction. That knowledge base may be local to the host computing system 400, possibly populated by querying the user for this information. In other embodiments, the knowledge base may be remote, accessible to many different processes 500 running in different spaces. In various implementations, the micro-hazard monitoring process 500 may also identify micro-hazards by performing movement and wear simulations in the mapped space. For example, the micro-hazard monitoring system 500 can determine likely user pathways through the space, how objects with defined types are expected to move given their properties and the physics laws (information possibly gained from the knowledge base), how objects are expected to experience wear over time (which may also be in the knowledge base), likely results of environment and weather factors (e.g., water seepage, tree limbs falling, wind forces, hail damage), etc. From these movement and wear determinations, the micro-hazard monitoring system 500 can perform various simulations, advancing time to determine when objects are likely to experience forces that, given their current wear, are likely to cause breakages. The simulations can then further advance time to determine how the projected breakages may further affect other objects. Thus, the micro-hazard monitoring system 500 can identify these individual and cascading breakages as micro-hazards.

To every micro-hazard that it identifies, the micro-hazard monitoring process 500 assigns one or more scores, the scores depend upon information from the simulations and micro-hazard scoring knowledge base: the likelihood of the hazard actually occurring, the extent of damage it might cause, the potential of cascading micro-hazards, and the like. A higher score is associated with a higher risk (which can indicate a combination of a likelihood of damage occurring and an extent of such damage), though details of the score calculation depend upon details of the implementation. In a very simple implementation, every identified micro-hazard receives a score high enough to merit a response in block 510 below. In more sophisticated implementations, the score reflects the likelihood and possible consequences of a particular micro-hazard, assigning a low score to very unlikely and mostly harmless micro-hazards and only surfacing the serious ones to the user. When the process 500 identifies a cascading micro-hazard, then that too is scored, the score being based, at least in part, on some combination of the scores of the contributing micro-hazards.

In some implementations, the user can review the assigned scores and reset them appropriately, for example to lessen a score if an object associated with a given micro-hazard is known to be unbreakable or nearly worthless. The user may also set a threshold, based on her personal risk preference, for example, and scores below that threshold are not presented. User preference may also limit the scoring to only certain types of possible consequences, e.g., only to those likely to cause personal injury.

In block 508, the micro-hazard monitoring process 500 considers the calculated micro-hazard scores along with information about the types and locations of objects in the set of objects associated with each micro-hazard. If an assigned score is above a threshold, the process 500 selects one or more remediation actions. The selection depends upon the score, the type of micro-hazard, and the resources at the process 500's disposal. A low score may warrant just a warning message, while a high score could warrant more active intervention such as sounding an alarm, calling an alarm-monitoring service, shutting off an electronic device or home utility (e.g., water, electricity, gas) associated with the micro-hazard, notifying a utility or insurance company, etc.

In block 510, the micro-hazard monitoring process 500 implements the one or more selected remedial actions. Specific implementations depend upon the specifics of the selected remediation and on the resources available. If the actions include a warning message, and the user is wearing an HMD 200, the warning may be sent directly to the HMD's view screen. In other cases, the warning may be emailed or texted to the user, or may be provided through a mobile app or push notification. Other micro-hazard scores may be high enough that the process 500 takes direct action. If for example, an electric lamp is close to a hot tub, and if the lamp is connected to a controller, then the hazard of electrocution may warrant the process 500 is sending a command to the controller to remove electrical power from the lamp. For a micro-hazard with a high enough score and whose associated set of objects include expensive or separately insured items, the process 500 may be authorized by the user to send a micro-hazard notification to an underwriter or insurer. The last may be useful in reconciling an insurance claim if the user is informed of a micro-hazard but does nothing to remediate it. When the user knows that she has allowed micro-hazard information to be sent to her insurer, the user is incented to secure her environment from micro-hazards which may in turn reduce her insurance premiums.

Figure 7:
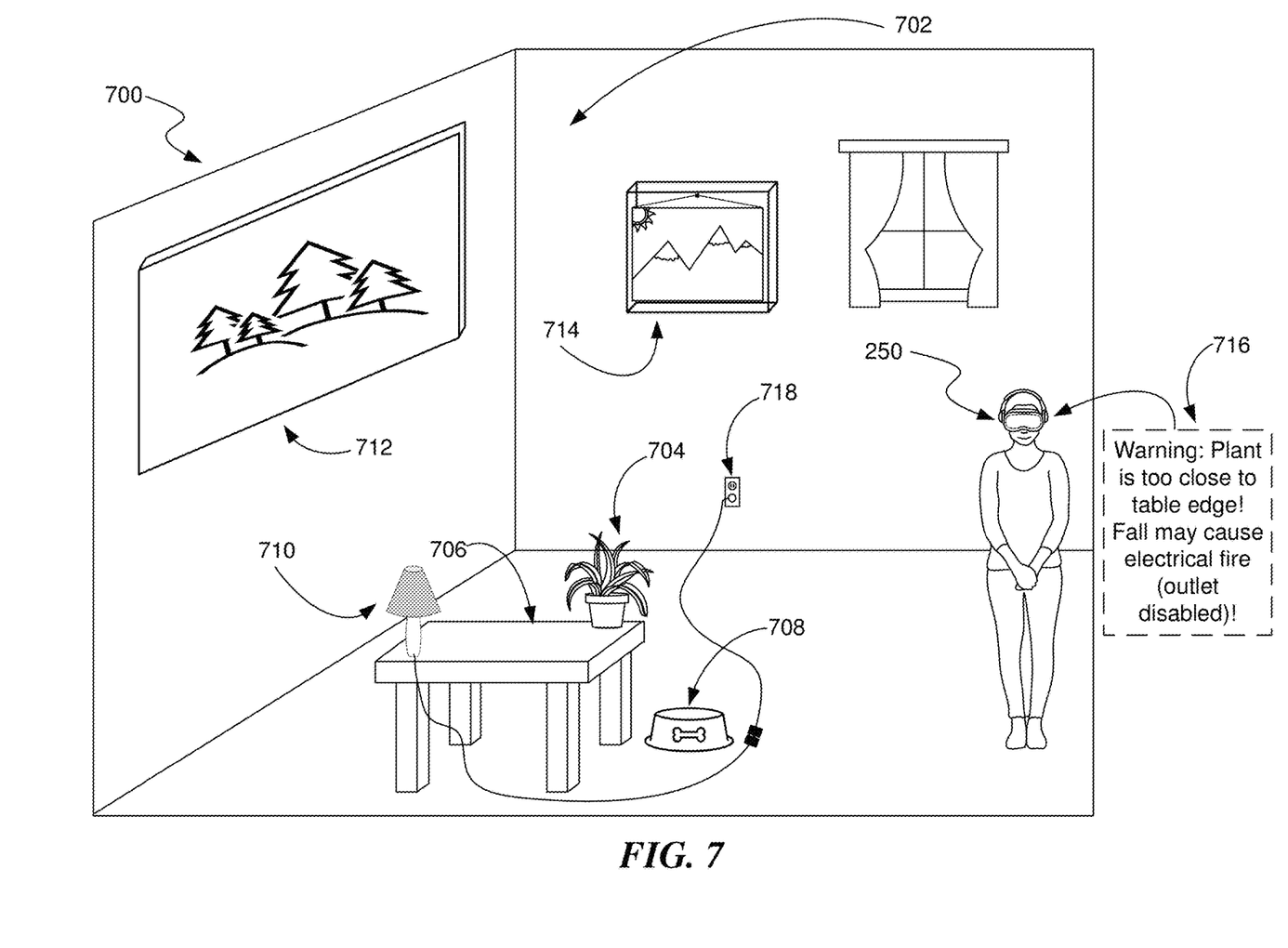
FIG. 7 is a conceptual diagram of a user traversing a room and receiving a micro-hazard warning.

The possibility of periodically re-running the micro-hazard monitoring process 500 to update the mapping is mentioned above. It should be noted that the blocks of FIG. 5 need not be followed in rigid order. For an example of the flexibility of the present technology, the scenario of FIG. 7 shows a user receiving a micro-hazard warning from the process 500 (block 510) during her directed traversal of the space (block 502).

The scenario 600 of FIG. 6 shows an office setting 602. A user 604 is wearing an HMD 250. As described in the text accompanying block 502 of FIG. 5, the user 604 is viewing his route-traversal instructions 606 through the view screen of his HMD 250. While FIG. 6 shows the instructions 606 visually, they may also be delivered through the HMD's speakers and tied to the user's present location as determined by an XR system or by a location-tracking device worn by the user 604.

The micro-hazard monitoring process 500 of FIG. 5 has created these traversal instructions by reviewing an existing map. During its review, the process 500 noted the presence of the door 608. The existing map has no information about the room or rooms 610 behind the door 608. Thus, the process 500 is sending the user 604 through the door 608 to take pictures of the entire sub-space 610. In this case, the instructions 606 are not more specific as the process 500 does not know what to expect.

In some implementations, the micro-hazard monitoring process 500 reviews the visual information continuously delivered by the HMD 250. That is, the process 500 looks at more than the results of the specific photographs the user 604 is directed to take. Doing so, the process 500 can compare the current situation in the office setting 602 to the existing map, note any changes, and possibly re-direct the user's traversal accordingly to inspect the changed locations.

The user's HMD 250 records the contents of the interior 610 and delivers them to the micro-hazard monitoring process 500. The process adds a map of that interior 610 to the existing map (block 504 of FIG. 5) and looks for any micro-hazards in the interior 610 (block 506). It might also detect micro-hazards whose set of objects includes one or more in the interior 610 and one or more in the previous mapped office space 602. In various implementations, the micro-hazard monitoring process 500 may also identify micro-hazards by performing movement and wear simulations in the newly mapped interior 610. For example, the micro-hazard monitoring system 500 can determine likely user pathways through the interior 610, how objects with defined types are expected to move given their properties and the physics laws, how objects are expected to experience wear over time, likely results of environment and weather factors, etc. From these movement and wear determinations, the micro-hazard monitoring system 500 can perform various simulations, advancing time to determine when objects are likely to experience forces that, given their current wear, are likely to cause breakages. The simulations can then further advance time to determine how the projected breakages may further affect other objects. Thus, the micro-hazard monitoring system 500 can identify these individual and cascading breakages as micro-hazards. In any case, the process 500 scores any detected micro-hazards and takes appropriate actions such as warning the user 604 of the micro-hazard, sounding an alarm, removing power from an electrical device, shutting off a home utility (e.g., water, electricity, gas), notifying a utility or insurance company, etc. (blocks 508 and 510).

The scenario 700 of FIG. 7 presents a residential room 702. The user's HMD 250 is clearly shown, and she has been directed by the micro-hazard monitoring process 500 to map this room 702 (block 502 of FIG. 5). Following the traversal instructions, either the user or her HMD 250 takes pictures and/or gathers depth data to map the room 702 and its objects. The process 500 analyzes this data, creates a new map for the room 702 or updates an existing one (block 504), and searches the identified objects for micro-hazards (block 506).

In this particular scenario 700, the micro-hazard monitoring process 500 notes the house plant 704 perched precariously near the edge of the table 706. Because the process 500 considers this to be a "breakage due to fall" micro-hazard, it creates a score for it (block 506). The process also notes that if the house plant 704 were to fall, it would hit and possibly tip over the dog dish 708. That is a second micro-hazard, and the process 500 scores it. The process 500 next notes that the spilled water may short the electrical cord leading to the table lamp 710, a third micro-hazard. These three micro-hazards, the first creating the conditions for the second, the second creating the conditions for the third, together form a cascading micro-hazard. The process 500 assigns a score to the cascade based, at least in part, on the scores of the three individual constituent micro-hazards (block 506). When selecting (block 508) and implementing (block 510) a remedial action, the process 500 can choose to focus remediation on the whole cascade or on its separate components.

Meanwhile, the micro-hazard monitoring process 500 notes the types and locations of the display screen 712 and wall art 714, updating its map of the room 702. Because these elements have not been identified as associated with any micro-hazards, their type and locations are recorded in an updated map if they have not been seen on a previous traversal, but they do not trigger the micro-hazard scoring, selection, and remediation (blocks 506, 508, 510).

Even while she is still traversing the room (block 502 of FIG. 5), the micro-hazard monitoring system 500 has already processed the house plant/table/dog dish/power cord micro-hazard, selected a warning as the appropriate remediation action, and delivered that warning 716 to the user's HMD 250. Because of the potential high damage from a fire, the third micro-hazard may cause the micro-hazard monitoring system 500, which has control over outlets in the user's home, to disable the outlet 718 until that hazard has been resolved.

In a future traversal of the room 702, the micro-hazard monitoring process 500 will note whether the house plant has been moved to safety and the dog water moved away from the electrical connection and the associated micro-hazards eliminated.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A non-transitory computer-readable storage medium storing instructions that, when executed by a computing system, cause the computing system to perform a process for addressing micro-hazards, the process comprising:
   obtaining a map of a space by gathering and aggregating data from at least one object tracker and at least one location tracking device;
   performing one or more simulations of the mapped space, wherein the one or more simulations identify a cascading micro-hazard, including a first micro-hazard potentially causing a second micro-hazard, by estimating future damage amounts and likelihoods based on A) predicted user movement in the space, B) predicted object movement in the space based on relative locations of objects in one or more sets and on types of objects in each set, and C) environment factors;
   for each of the one or more sets of objects in the space, computing a cascading micro-hazard score, including a combination of a first micro-hazard score for the first micro-hazard and a second micro-hazard score for the second micro-hazard, based, at least in part, on relative locations of objects in the set and on types of objects in the set;

applying one or more selected remediation procedures including
automatically turning off one or more objects in the set associated with the cascading micro-hazard.

2. The non-transitory computer-readable storage medium of claim 1 wherein the obtaining a map of a space comprises:
providing a user with flow directions, the flow directions comprising a route to take through the space and/or locations at which to take pictures;
receiving information associated with the space, the received information comprising pictures taken during the flow and locations associated with the pictures obtained from the at least one location tracking device; and
from the received information, producing the map of the space, the map comprising types and locations of objects in the space.

3. The non-transitory computer-readable storage medium of claim 1 wherein the one or more objects are turned off based on a mapping of cascading micro-hazard scores to remediation procedures.

4. The non-transitory computer-readable storage medium of claim 1 wherein the computing the cascading micro-hazard score is further based, at least in part, on a potential for one or more of: breakage due to fall, leakage, electrical interaction, steam damage, water damage, heat damage, fire damage, poisoning, or any combination thereof.

5. A computing system for addressing micro-hazards, the computing system comprising:
one or more processors; and
one or more memories storing instructions that, when executed by the one or more processors, cause the computing system to perform a process comprising:
obtaining a map of a space by gathering and aggregating data from at least one object tracker and at least one location tracking device;
performing one or more simulations of the mapped space, wherein the one or more simulations identify a cascading micro-hazard, including a first micro-hazard potentially causing a second micro-hazard, by estimating future damage amounts and likelihoods based on A) predicted user movement in the space, B) predicted object movement in the space based on relative locations of objects in one or more sets and on types of objects in each set, and environment factors;
for each of the one or more sets of objects in the space, computing a cascading micro-hazard score, including a combination of a first micro-hazard score for the first micro-hazard and a second micro-hazard score for the second micro-hazard, based, at least in part, on relative locations of objects in the set and on types of objects in the set;
applying one or more selected remediation procedures including
automatically turning off one or more objects in the set associated with the cascading micro-hazard.

6. The computing system of claim 5 wherein the obtaining a map of a space comprises:
providing a user with flow directions, the flow directions comprising a route to take through the space and/or locations at which to take pictures;
receiving information associated with the space, the received information comprising pictures taken during the flow and locations associated with the pictures obtained from the at least one location tracking device; and
from the received information, producing the map of the space, the map comprising types and locations of objects in the space.

7. The computing system of claim 5 wherein the one or more objects are automatically turned off based on a mapping of micro-hazard scores to remediation procedures.

8. The computing system of claim 5 wherein the computing system comprises one or more of: a personal computing device, a smart phone, a server, an XR system, or any combination thereof.

9. The computing system of claim 5 wherein at least one of the at least one object tracker, the at least one location tracking device, or both includes one or more of: a radio frequency identification tag, camera, depth sensor, inertial measurement unit sensor, global positioning system receiver, a light detection and ranging system, computer vision, head-mounted display, feed from an artificial reality system, or any combination thereof.

10. A method for addressing micro-hazards, the method comprising:
obtaining, by a computing system, a map of a space by gathering and aggregating data from at least one object tracker and at least one location tracking device;
performing, by the computing system, one or more simulations of the mapped space, wherein the one or more simulations identify a cascading micro-hazard, including a first micro-hazard potentially causing a second micro-hazard, by estimating future damage amounts and likelihoods based on A) predicted user movement in the space, B) predicted object movement in the space based on relative locations of objects in one or more sets and on types of objects in each set, and C) environment factors;
for each of the one or more sets of objects in the space, computing, by the computing system, a cascading micro-hazard score, including a combination of a first micro-hazard score for the first micro-hazard and a second micro-hazard score for the second micro-hazard, based, at least in part, on relative locations of objects in the set and on types of objects in the set;
applying, by the computing system, one or more selected remediation procedures including
automatically turning off one or more objects in the set associated with the cascading micro-hazard.

11. The method of claim 10, wherein the obtaining the map of the space comprises:
providing, by the computing system, a user with flow directions, the flow directions comprising a route to take through the space and/or locations at which to take pictures;
receiving information, by the computing system, associated with the space, the received information comprising pictures taken during the flow and locations associated with the pictures obtained from the at least one location tracking device; and
from the received information, producing, by the computing system, the map of the space, the map comprising types and locations of objects in the space.

12. The method of claim 11, wherein the providing a user with flow directions is based, at least in part, on an existing map of the space.

13. The method of claim 11, wherein the receiving information associated with the space comprises receiving information from one or more of: a radio frequency identification tag, depth sensor, inertial measurement unit sensor, global positioning system receiver, light detection and ranging system, head-mounted display, or any combination thereof.

14. The method of claim 10, wherein the environment factors include one or more of: weather, water seepage, a tree limb falling, wind force, hail damage, wear on an object, or any combination thereof.

15. The method of claim 10,
wherein the one or more selected remediation procedures further include sending, by the computing system, underwriting information associated with the cascading micro-hazard; and
wherein sending underwriting information comprises sending information, by the computing system, to an underwriter associated with an insurer associated with a user of the space and/or an insurer associated with the user.

16. The method of claim 10, wherein the computing the cascading micro-hazard score is further based, at least in part, on a potential for one or more of: breakage due to fall, leakage, electrical interaction, steam damage, water damage, heat damage, fire damage, poisoning, or any combination thereof.

17. The method of claim 10, wherein the one or more objects are automatically turned off based, at least in part, on the first micro-hazard score and the second micro-hazard score that make up the cascading micro-hazard.

18. The method of claim 10,
wherein the one or more selected remediation procedures further include providing a warning, by the computing system, of the cascading micro-hazard; and
wherein the providing the warning comprises one or more of: sending an email, sending a text message, sending a voice message, sounding an alarm, calling an alarm-monitoring service, or any combination thereof.

19. The method of claim 10,
wherein the automatically turning off the one or more objects comprises one or more of: removing electrical power, sending a shut-down command, disabling a utility, or any combination thereof.

* * * * *